United States Patent
Wang

(10) Patent No.: US 9,264,646 B2
(45) Date of Patent: Feb. 16, 2016

(54) ELECTRONIC DEVICE AND VIDEO PLAYING METHOD

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Peng Wang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/336,099

(22) Filed: Jul. 21, 2014

(65) Prior Publication Data
US 2015/0022683 A1    Jan. 22, 2015

(30) Foreign Application Priority Data
Jul. 22, 2013    (CN) .......................... 2013 1 03077706

(51) Int. Cl.
*H04N 5/44*    (2011.01)
*H04N 21/414*    (2011.01)
*H04N 21/4223*    (2011.01)
*H04N 21/432*    (2011.01)
*H04N 21/442*    (2011.01)
*G06K 9/00*    (2006.01)
*H04N 5/77*    (2006.01)

(52) U.S. Cl.
CPC ....... *H04N 5/4403* (2013.01); *H04N 21/41407* (2013.01); *H04N 21/4223* (2013.01); *H04N 21/4325* (2013.01); *H04N 21/44218* (2013.01); *G06K 9/00228* (2013.01); *H04N 5/772* (2013.01)

(58) Field of Classification Search
CPC .......... H04N 5/23219; H04N 5/23241; H04N 5/23293; H04N 5/4403; H04N 5/23229; G06K 9/00228
See application file for complete search history.

(56) References Cited

U.S. PATENT DOCUMENTS

2010/0165114 A1*    7/2010    Goh .............................. 348/169
2014/0043498 A1*    2/2014    Lee et al. ................... 348/222.1

\* cited by examiner

*Primary Examiner* — Tuan Ho
(74) *Attorney, Agent, or Firm* — Novak Druce Connolly Bove + Quigg LLP

(57) ABSTRACT

A video playing method for an electronic device, the electronic device includes a display and an image capturing apparatus. The image capturing apparatus captures images in real-time while a video is being displayed by the electronic device. The electronic device determines whether each of the images captured by the image capturing apparatus includes facial characteristics. If one or more images do not include the facial characteristics, the video is automatically paused.

14 Claims, 3 Drawing Sheets

ELECTRONIC DEVICE AND VIDEO PLAYING METHOD

CROSS-REFERENCE TO RELATED APPLICATIONS

This application claims priority to Chinese Patent Application No. 201310307770.6 filed on Jul. 22, 2013 in the Chinese Intellectual Property Office, the contents of which are incorporated by reference herein.

FIELD

The present disclosure generally relates to electronic devices, and more particularly, to a video playing method of an electronic device.

BACKGROUND

Electronic devices such as smart phones, portable media players, and tablet computers are usually used to play videos. The video may be manually paused according to user acquirements while viewing the video.

BRIEF DESCRIPTION OF THE DRAWINGS

Implementations of the present technology will now be described, by way of example only, with reference to the attached figures.

DETAILED DESCRIPTION

Figure 1:
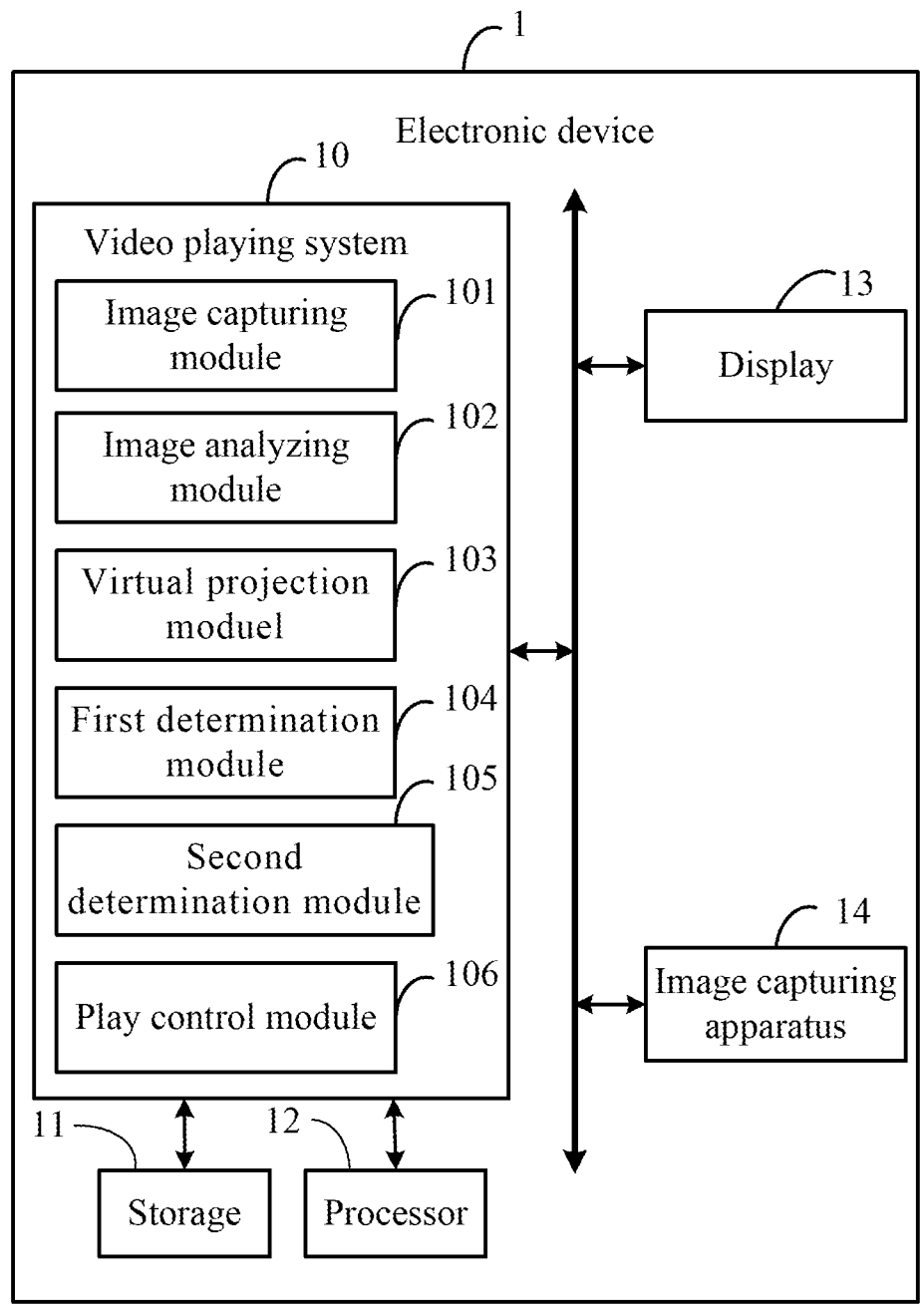
FIG. 1 is a block diagram of an electronic device including a video playing system.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "coupled" is defined as connected, whether directly or indirectly through intervening components, and is not necessarily limited to physical connections. The connection can be such that the objects are permanently connected or releasably connected. The word "module," as used herein, refers to logic embodied in hardware or firmware, or to a collection of software instructions, written in a programming language, such as, Java, C, or assembly. One or more software instructions in the modules can be embedded in firmware, such as in an erasable programmable read only memory (EPROM). The modules described herein may be implemented as either software and/or hardware modules and may be stored in any type of non-transitory computer-readable medium or other storage device. Some non-limiting examples of non-transitory computer-readable medium include CDs, DVDs, BLU-RAY™, flash memory, and hard disk drives.

The present disclosure is described in relation to a video playing method for an electronic device.

FIG. 1 illustrates a block diagram of the electronic device. An electronic device 1 can include a video playing system 10, a storage 11, a processor 12, a display 13, and an image capturing apparatus 14. In at least one embodiment, the electronic device 1 stores a plurality of videos which can be played by the video playing system 10. The electronic device 1 can be a smart phone, a portable media player, a tablet computer, a desk computer, or other similar device having the video playing system 10. FIG. 1 illustrates one example of the electronic device 1, and the electronic device 1 can include more or fewer components than those shown in the figure, or have a different configuration of the components.

The video playing system 10 can include a plurality of programs in the form of one or more computerized instructions stored in the storage 11 and executed by the processor 12 to perform operations of the electronic device 1. In one embodiment, the video playing system 10 includes an image capturing module 101, an image analyzing module 102, a virtual projection module 103, a first determination module 104, a second determination module 105, and a play control module 106.

The image capturing module 101 controls the image capturing apparatus 14 to capture images in real-time while a video is being displayed on the display 13 of the electronic device 1. In at least one embodiment, the image capturing apparatus 14 can be installed at a front side of the display 13 of the electronic device 1 to face a user, thereby capturing user images in front of the display 13. The image capturing apparatus 14 can be a front camera of the electronic device 1. The image capturing module 101 can control the image capturing apparatus 14 to capture images at regular time intervals. For example, the image capturing apparatus 14 can capture an image every two or three seconds.

The image analyzing module 102 determines whether each of the images captured by the image capturing apparatus 14 includes facial characteristics. In at least one embodiment, the image analyzing module 102 can recognize the facial characteristics from each of the images using facial recognition technologies. If one or more images captured by the image capturing apparatus 14 do not include the facial characteristics, the play control module 106 can control the electronic device 1 to pause the video.

If the facial characteristics are included in each of the images captured by the image capturing apparatus 14, the virtual projection module 103 virtually projects a present image captured by the image capturing apparatus 14 to a display area of the display 13. In at least one embodiment, the term "virtually projects" may refer to the present image is virtually displayed by the display 13 but the present image cannot be seen from the display 13. The virtual projection module 103 can first zoom (e.g., zoom in or zoom out) the present image to make sure the present image has the same size as the display area of the display 13, and then virtually projects the zoomed present image to the display area of the display 13.

The first determination module 104 determines if one or more facial characteristics are included in a predetermined region of the display area. If one or more facial characteristics are included in the predetermined region, the facial characteristics within the predetermined region are compared to all of the facial characteristics within the preset image. The second determination module 105 can then determine if a ratio of the one or more facial characteristics within the predetermined region is greater than a predetermined value (e.g., 50%). In at least one embodiment, the ratio can be calculated according to an amount of pixels corresponding to the one or more facial characteristics within the predetermined region and an amount of pixels corresponding all of the facial characteristics within the present image. If the ratio is greater than the predetermined value, the video is displayed in a normal way.

Figure 3:
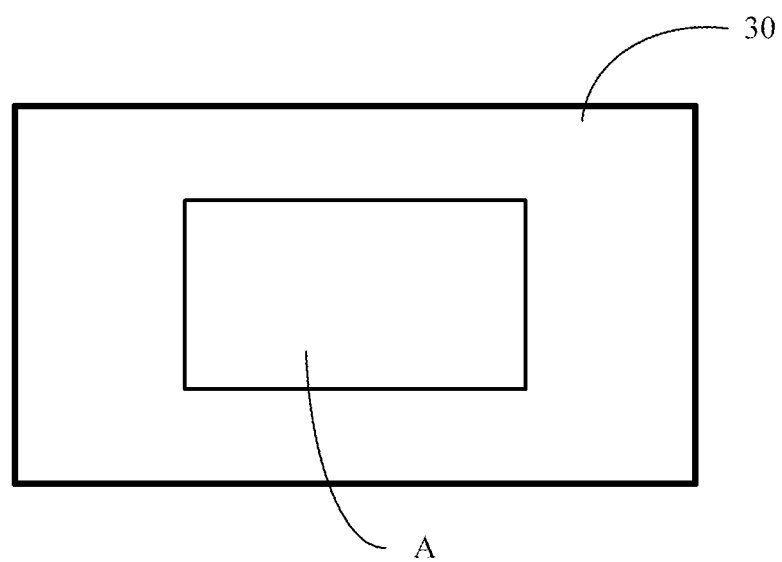
FIG. 3 illustrates a diagrammatic view of a predetermined region within a display area of the electronic device.

In an example as shown in FIG. 3, a region A is an example of the predetermined region. A size and a position of the predetermined region in the display area of the display 13 can be manually preset. For example, the rectangular region A can have the same center as the display area and be half the length and width of the display area.

If the display area does not include any facial characteristic, the play control module 106 can control the electronic device 1 to reduce a play speed of the video. In at least one embodiment, the electronic device 1 may perform a slow motion playback function to reduce the play speed of the video. The play control module 106 can further record time information when the play speed of the video is reduced in the storage 11 and displays the time information on the display 13.

Figure 2:
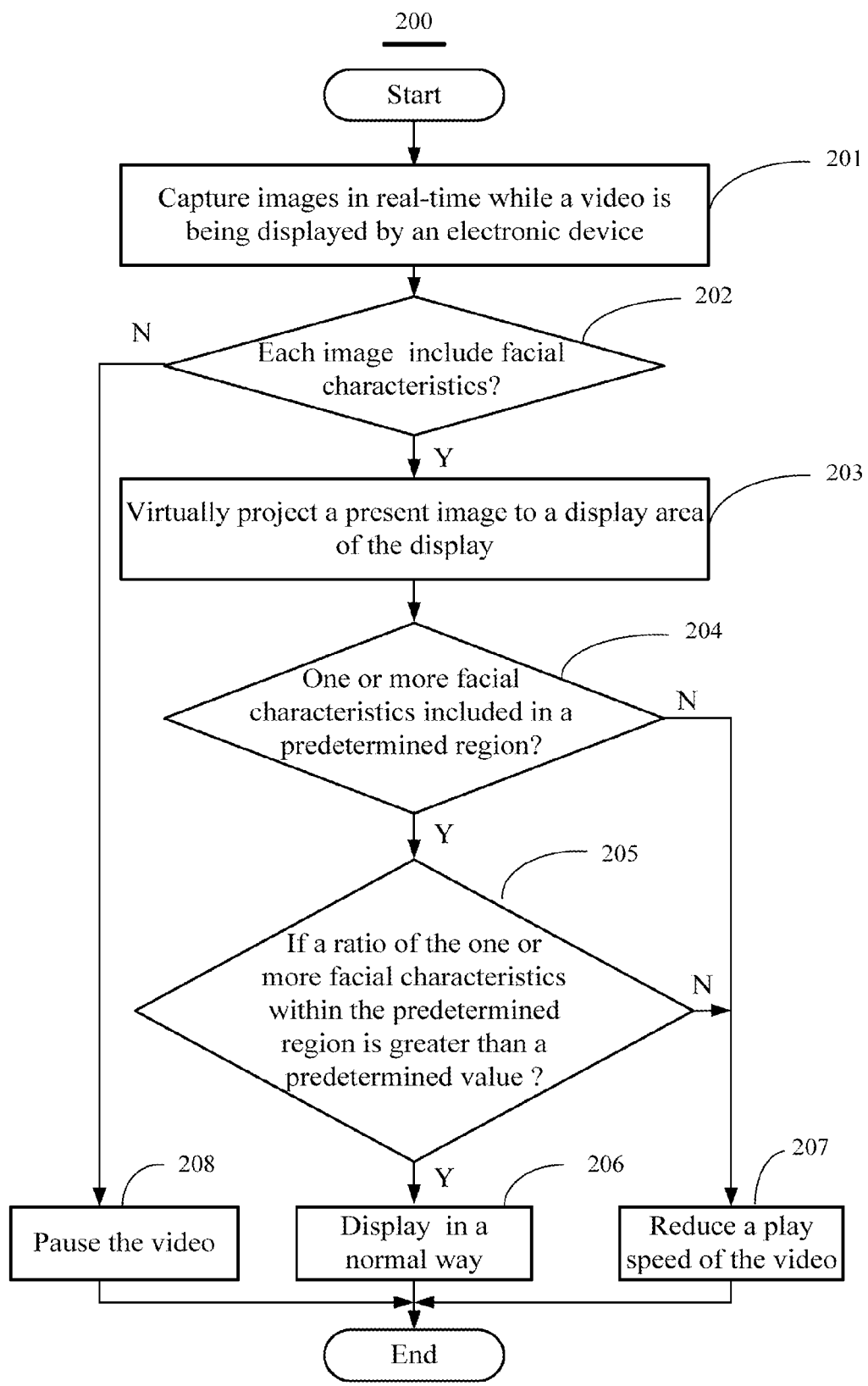
FIG. 2 is a flowchart diagram of one embodiment of a video playing implemented by the video playing system of FIG. 1.

FIG. 2 illustrates a flowchart in accordance with an example method. The example method 200 is provided by way of example, as there are a variety of ways to carry out the method. The method 200 described below can be carried out using the configurations illustrated in FIG. 1, for example, and various elements of this figure are referenced in explaining example method 200. Each block shown in FIG. 2 represents one or more processes, methods or subroutines, carried out in the example method 200. Furthermore, the order of blocks is illustrative only and the order of the blocks can change according to the present disclosure. Additional blocks can be added or fewer blocks may be utilized, without departing from this disclosure. The example method 200 can begin at block 201.

At block 201, the image capturing module 101 controls the image capturing apparatus 14 to capture images in real-time while a video is being displayed on the display 13.

At block 202, the image analyzing module 102 determines whether each of the images captured by the image capturing apparatus 14 includes facial characteristics. If one or more images captured by the image capturing apparatus 14 does not include the facial characteristics, block 208 is implemented. Otherwise, block 203 is implemented.

At block 203, the virtual projection module 103 virtually projects a present image captured by the image capturing apparatus 14 to a display an area of the display 13. In this embodiment, the term "virtually projects" may refer to the present image that is virtually displayed by the display 13 but the present image cannot be seen from the display 13.

At block 204, the first determination module 104 determines if one or more facial characteristics are included in a predetermined region of the display area. If one or more facial characteristics are included in the predetermined region, block 205 is implemented. Otherwise, block 207 is implemented.

At block 205, the facial characteristics within the predetermined region are compared to all of the facial characteristics within the preset image, the second determination module 105 determines if a ratio of the one or more facial characteristics within the predetermined region is greater than a predetermined value (e.g., 50%). If the ratio is greater than the predetermined value, block 206 is implemented. Otherwise, block 207 is implemented.

At block 206, the play control module 106 controls the electronic device 1 to display the video in a normal way, and the procedure ends.

At block 207, the play control module 106 controls the electronic device 1 to reduce a play speed of the video, and the procedure ends.

At block 208, the play control module 106 controls the electronic device 1 to pause the video, and the procedure ends.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. An electronic device comprising:
a processor;
a display coupled to the processor;
an image capturing apparatus coupled to the processor; and
a non-transitory storage medium coupled to the processor and configured to store one or more programs, which when executed by the processor, cause the processor to:
    capture images using the image capturing apparatus, in real-time while a video is being displayed on the display;
    determine whether each of the images captured by the image capturing apparatus comprises facial characteristics; and
    pause the video if one or more image captured by the image capturing apparatus does not comprise the facial characteristics;
wherein the processor further virtually projects a present image captured by the image capturing apparatus to a display area of the display when the present image comprises the facial characteristics, determines if one or more facial characteristics are comprised in a predetermined region of the display area, and reduces a play speed of the video if no facial characteristic is comprised in the predetermined area.

2. The electronic device according to claim 1, wherein when one or more facial characteristics are comprised in the predetermined region, the processor further compares the one or more facial characteristics within the predetermined region to all of the facial characteristics within the preset image and determines if a ratio of the one or more facial characteristics within the predetermined region is greater than a predetermined value, and reduces the play speed of the video if the ratio is less than the predetermined value.

3. The electronic device according to claim 2, wherein the processor further controls the electronic device to display the video in a normal way if the ratio is greater than the predetermined value.

4. The electronic device according to claim 2, wherein the processor calculates the ratio according to an amount of pixels corresponding to the one or more facial characteristics within the predetermined region and an amount of pixels corresponding all of the facial characteristics within the present image.

5. The electronic device according to claim 1, wherein the processor further records time information when the play speed of the video is reduced in the storage and displays the time information on the display.

6. The electronic device according to claim 1, wherein processor further zooms the present image to make the present image has the same size with the display area of the display before the present image is virtually projected to the display area.

7. The electronic device according to claim 1, wherein the image capturing apparatus captures the images at regular time intervals.

8. A video playing method of an electronic device comprising:
- capturing images using an image capturing apparatus, in real-time while a video is being displayed on a display of the electronic device;
- determining whether each of the images captured by the image capturing apparatus comprises facial characteristics;
- pausing the video if one or more image captured by the image capturing apparatus does not comprise the facial characteristics;
- virtually projecting a present image captured by the image capturing apparatus to a display area of a display of the electronic device when the present image comprises the facial characteristics;
- determining if one or more facial characteristics are comprised in a predetermined region of the display area; and
- reducing a play speed of the video if no facial characteristic is comprised in the predetermined area.

9. The method according to claim 8, further comprising:
comparing the one or more facial characteristics within the predetermined region to all of the facial characteristics within the preset image and determines when the one or more facial characteristics are comprised in the predetermined region;
- determining if a ratio of the one or more facial characteristics within the predetermined region is greater than a predetermined value; and
- reducing the play speed of the video if the ratio is less than the predetermined value.

10. The method according to claim 9, further comprising:
controlling the electronic device to display the video in a normal way if the ratio is greater than the predetermined value.

11. The method according to claim 9, wherein the ratio is calculated according to an amount of pixels corresponding to the one or more facial characteristics within the predetermined region and an amount of pixels corresponding all of the facial characteristics within the present image.

12. The method according to claim 8, further comprising:
recording time information when the play speed of the video is reduced in a storage of the electronic device and displaying the time information on the display.

13. The method according to claim 8, wherein the present image is zoomed to have the same size with the display area of the display before the present image is virtually projected to the display area.

14. The method according to claim 8, wherein the images are captured at regular time intervals by the image capturing apparatus.

* * * * *